INVENTOR.
A.B. BROERMAN
BY Hudson & Young
ATTORNEYS

United States Patent Office 2,933,974
Patented Apr. 26, 1960

2,933,974
DIFFERENTIAL REFRACTOMETER

Arthur B. Broerman, Bartlesville, Okla., assignor to Phillips Petroleum Company, a corporation of Delaware Application January 24, 1957, Serial No. 636,120

5 Claims. (Cl. 88—14)

This invention relates to the measurement of the refractive index of a fluid stream.

In various chemical and petroleum refining operations, it has become common practice to analyze a sample stream removed from some point in the process and to adjust a process variable in response to the analysis to maintain desired operating conditions. One particular system of analysis that has proved to be effective involves measuring the refractive index of the sample stream. The refractive index of a fluid mixture is a function of the composition of the mixture so that a measurement of this refractive index provides information regarding the composition of the mixture. Refractive indices are, generally, additive on a volume basis.

In accordance with the present invention, there is provided an improved differential refractometer which is capable of measuring continuously the refractive index of a fluid stream. This measurement is advantageously made by comparing the refractive index of a fluid stream with the refractive index of a reference fluid. A beam of radiation is directed through a refractometer cell assembly, and the deviation of the emerging beam is measured to provide an indication of the difference between the refractive indices of two fluids contained within the cell assembly. This measurement is made by directing the emerging beam from the refractometer cell assembly toward a detector assembly which comprises two adjacent radiation detectors. The beam initially is adjusted so that equal, or predetermined, amounts of radiation impinge upon the two detectors. Any change from this condition results in an output signal from the detectors which is representative of the differential amounts of radiation impinging upon the two detectors. A radiation deflector is mounted on a lever arm between the two detectors so that rotation of the deflector changes the amounts of radiation impinging upon the two detectors. This lever arm is rotated by a servo motor which rotates continuously. The servo motor is connected to the lever arm through two clutches which are energized by the output signal from the detector unit. The particular clutch that is energized is representative of the direction of the deviation of the radiation beam from the original position. The movement of the lever necessary to restore a balanced condition is representative of the deviation of the refractive index of the sample material from a preselected value.

Accordingly, it is an object of this invention to provide improved apparatus for measuring the refractive index of a fluid stream.

Another object is to provide a differential refractometer having a simplified servo system incorporated therein.

Other objects and advantages and features of the invention should become apparent from the following detailed description which is taken in conjunction with the accompanying drawing in which.

Figure 1:
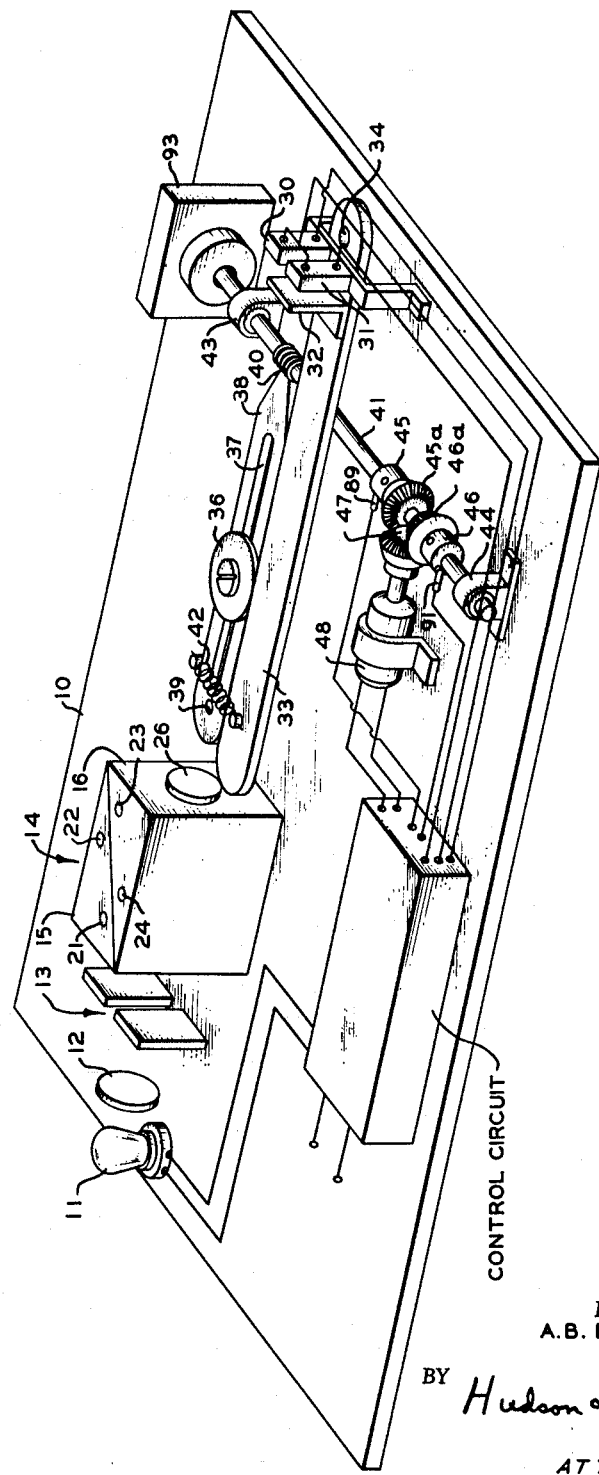
Figure 1 is a schematic representation of the differential refractometer of this invention.

Referring now to the drawing in detail and to Figure 1 in particular, there is shown a base 10 which supports the components of the refractometer. Radiation is provided by lamp 11 which can be an incandescent bulb. A portion of the radiation emitted from bulb 11 is directed by a condensing lens 12 through a slit assembly 13. The radiation transmitted through assembly 13 passes through a refractometer cell assembly 14 which comprises two adjacent blocks 15 and 16 having respective chambers 17 and 18 therein, see Figure 2. Chambers 17 and 18 are divided by a plate of transparent material 20. Chamber 17 is provided with respective inlet and outlet openings 21 and 22, and chamber 18 is provided with respective inlet and outlet openings 23 and 24. These openings permit fluids to be circulated through or disposed within the two chambers of the cell assembly. A first collimating lens 25 is positioned across the inlet of the cell assembly, and a converging lens 26 is fitted across the outlet of the assembly. The emerging radiation beam is focused by lens 26 toward a detector unit which comprises adjacent photoconductive cells 30 and 31. A light opaque barrier 32 is mounted on a lever 33 at a position between cells 30 and 31. Lever 33 is pivotally attached to base 10 by a pin 34.

If the refractive indices of the fluids in chambers 17 and 18 are equal, the radiation beam emerging from the cell assembly is parallel to the radiation beam which enters the assembly through lens 25. The analyzer preferably is adjusted initially so that equal amounts of radiation impinge upon cells 30 and 31 when the refractive index of the sample material is the same as the refractive index of the reference material.

If the refractive index of the sample material should change, the beam of radiation emerging from cell assembly 14 is no longer parallel to the beam which enters the assembly, and one of the photocells receives a greater amount of radiation. If cell 30 should receive a greater amount of radiation than cell 31, lever 33 must be rotated in a clockwise direction about pin 34 to restore a balanced condition. This rotation is performed automatically by a servo system which maintains the analyzer in a state of balance at all times. The amount of rotation of lever 33 that is required to restore the balanced condition is an indication of the deviation of the refractive index of the sample material from an initial value.

Lever 33 engages a disk 36 which is adjustably mounted in a slot 37 in a second lever 38. The first end of lever 38 is pivotally attached to base 10 by a pin 39. The second end of lever 38 is provided with teeth which engage a threaded sleeve 40. Sleeve 40 is mounted on a shaft 41 so that rotation of the shaft pivots lever 38 about pin 39. A spring 42 retains lever 33 in engagement with disk 36. Shaft 41 is supported by bearing assemblies 43 and 44 and carries two magnetic clutches 45 and 46. These two clutches connect shaft 41 to a bevel gear 47 when energized. Bevel gear 47 is mounted on the drive shaft of a constant speed motor 48. If clutch 45 is energized, for example, shaft 41 is rotated in a first direction by motor 48 so as to pivot lever 33 in a first direction to change the amounts of radiation impinging upon the two photocells. If clutch 46 is energized, shaft 41 and lever 33 are moved in opposite directions. The sensitivity of this servo system can readily be varied by adjusting the position of disk 36 in slot 37. For example, a greater rotation of sleeve 40 is required to rotate lever 33 through a given angle if disk 36 is disposed near the left hand end of slot 37.

Figure 2:
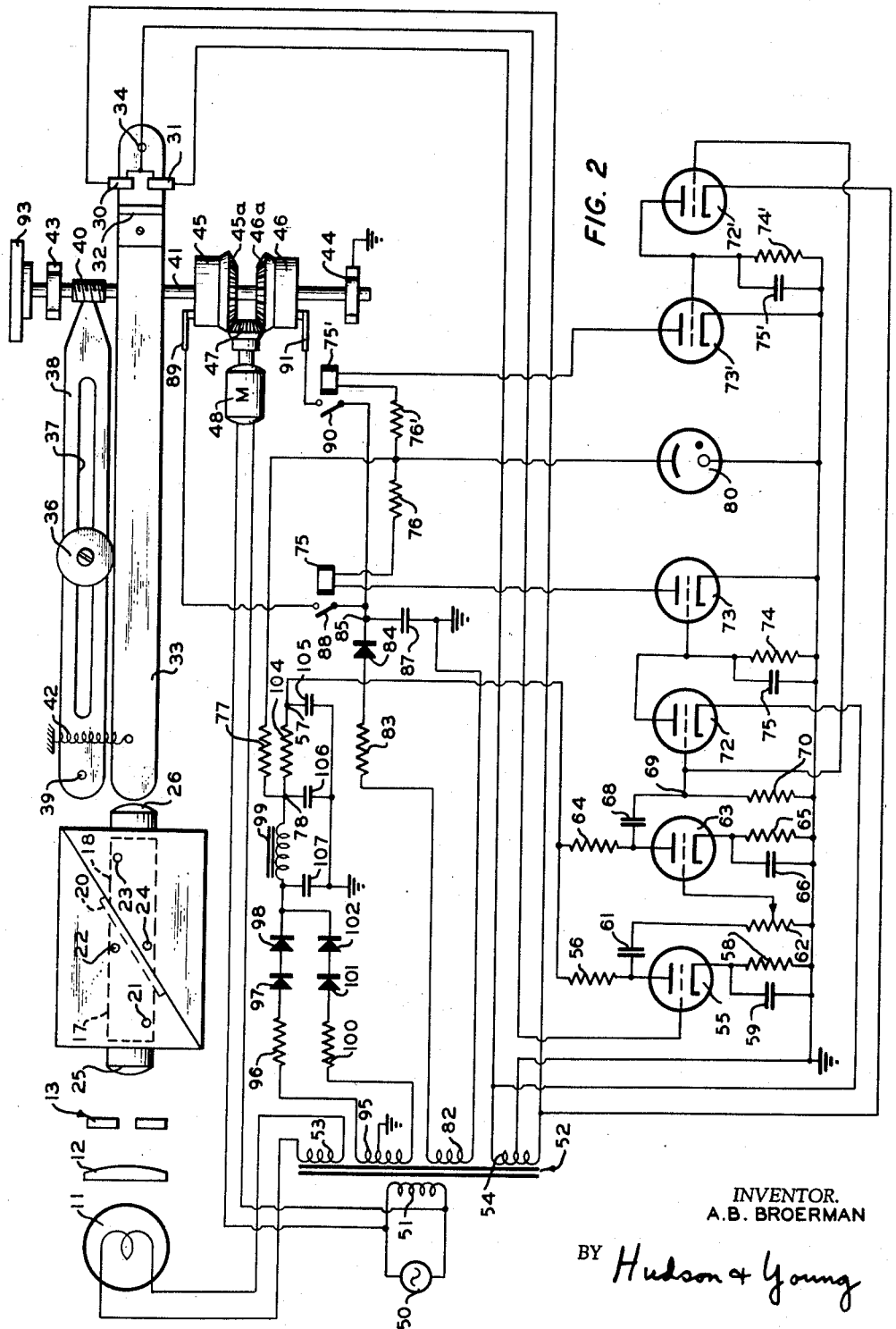
Figure 2 illustrates schematically the electrical circuit associated with the refractometer.

The electrical components of the differential refractometer are illustrated schematically in Figure 2. The instrument is energized by a source of alternating current 50 which is connected across the primary winding 51 of a transformer 52. Current source 50 is also connected directly to motor 48. Radiation source 11 is energized by a first secondary winding 53 of transformer 52. Photocells 30 and 31 are connected in series relationship with one another across a second secondary winding 54 of transformer 52. The center tap of transformer winding 54 is connected to ground. The junction between photocells 30 and 31 is connected to control grid of a triode 55. The anode of triode 55 is connected through a resistor 56 to a positive potential terminal 57. The cathode of triode 55 is connected to ground through a resistor 58 which is shunted by a capacitor 59. The anode of triode 55 is connected to ground through a capacitor 61 and a potentiometer 62. The contactor of potentiometer 62 is connected to the control grid of a second triode 63. The anode of triode 63 is connected through a resistor 64 to terminal 57. The cathode of triode 63 is connected to ground through a resistor 65 which is shunted by a capacitor 66. The anode of triode 63 is connected through a capacitor 68 to a terminal 69. Terminal 69 is connected to ground through a resistor 70.

The circuit thus far described provides a signal which is representative of the relative amounts of radiation impinging upon cells 30 and 31. These two cells are connected in an alternating current bridge network with the two halves of transformer winding 54. If the two photocells are alike and if they receive equal amounts of radiation, there is a zero potential difference between the control grid of triode 55 and ground. If one of the photocells receives more radiation than the other, a potential difference exists between the control grid of triode 55 and ground. The phase of this potential depends upon which of the photocells receives the greatest amount of radiation. This potential is amplified by the two-stage amplifier formed by triodes 55 and 63.

Terminal 69 is connected to the control grid of a triode 72. The anode of triode 72 is connected to the control grid of a triode 73. The control grid of triode 73 is connected to ground through a resistor 74 which is shunted by a capacitor 75. The cathode of triode 73 is connected to ground. The anode of triode 73 is connected through the coil of a relay 75 and resistors 76 and 77 to a positive potential terminal 78. Terminal 69 is also connected to the control grid of a triode 72'. The anode of triode 72' is connected to the control grid of a triode 73'. These two triodes and the circuit elements associated therewith are generally similar to respective triodes 72 and 73, and corresponding elements are designated by like primed reference numerals. A voltage regulating tube 80 is connected between ground and the junction between resistors 76 and 76'. The cathode of triode 72 is connected to the first end terminal of transformer winding 54, and the cathode of triode 72' is connected to the second end terminal of transformer winding 54.

In the absence of a potential difference between terminals 69 and ground, triodes 72 and 72' conduct during alternate half cycles of the voltage applied to the cathodes thereof. Triode 72 conducts when its cathode is negative with respect to ground and triode 72' when its cathode is negative with respect to ground. The conduction by these two triodes results in charges being stored on capacitors 75 and 75'. These charges tend to leak off through respective resistors 74 and 74' during the alternate half cycles. The charges on capacitors 75 and 75' are sufficient to prevent triodes 73 and 73' from conducting. If a negative potential appears at terminal 69 at the time the cathode of triode 72 is negative, triode 72 no longer conducts so that no charge accumulates on capacitor 75. This permits triode 73 to conduct to energize relay 75. If a negative potential appears at terminal 69 at the time the cathode of triode 73 is negative, triode 73' becomes conductive to energize relay 75'. Thus, one of the relays is energized whenever the analyzer becomes unbalanced by unequal amounts of radiation impinging upon the two photocells.

Magnetic clutches 45 and 46 are energized by a source of direct current which is obtained from a third transformer winding 82 of transformer 52. The first terminal of transformer winding 82 is connected through a resistor 83 and a rectifier 84 to a terminal 85. A filter capacitor 87 is connected between terminal 85 and the grounded second end terminal of transformer winding 82. Terminal 85 is connected through a switch 88 to a commutator 89 which engages magnetic clutch 45. Terminal 85 is also connected through a switch 90 to a commutator 91 which engages magnetic clutch 46. Switches 88 and 90 are closed when relays 75 and 75', respectively, are energized. The circuits through clutches 45 and 46 are completed through grounded shaft 41. Thus, clutch 45 is energized when relay 75 is energized and clutch 46 is energized when relay 75' is energized. Shaft 41 is rotated in a first direction when clutch 45 is energized and is rotated in a second direction when clutch 46 is energized. The shaft remains stationary when neither clutch is energized. A telemetering potentiometer 93 is connected to shaft 41 to provide an output electrical signal that is representative of the rotation of the shaft. A dial, not shown, can also be attached to shaft 41 to provide a visual indication of the rotation thereof.

Potential terminals 57 and 78 are connected to the output of a rectifier circuit that is associated with a fourth secondary winding 95 of transformer 52. The first end terminal of transformer winding 95 is connected through a resistor 96, rectifiers 97 and 98, and an inductor 99 to terminal 78. The second end terminal of transformer winding 95 is connected to terminal 78 through a resistor 100, rectifiers 101 and 102 and inductor 99. The center tap of transformer winding 95 is connected to ground. Terminal 78 is connected to terminal 57 through a resistor 104. Filter capacitors 105 and 106 are connected between ground and terminals 57 and 78, respectively. A filter capacitor 107 is connected between ground and the junction between inductor 99 and rectifier 98. This circuit provides positive potentials at terminals 78 and 57.

From the foregoing description, it should be evident that there is provided in accordance with this invention an improved analyzer which is capable of measuring the difference between the refractive indices of the two materials. In most operations, a reference fluid is locked into one of the chambers 17 or 18 of cell assembly 14. A sample fluid to be measured is circulated continuously through the other chamber. However, the instrument can be employed to compare continuously the refractive indices of two flowing samples. The servo system associated with this analyzer employs simple mechanical components which provide an accurate balance. In a modification of this analyzer, element 32 can represent a refractor block of transparent material. In such an embodiment, slit assembly 13 provides a relatively narrow beam of light which normally is focused between cells 30 and 31. Rotation of refractor block 32 serves to deviate the direction of the beam by an amount sufficient to restore the beam to the center location if the initial beam is deviated due to changes in the refractive index of the sample fluid.

While the invention has been described in conjunction with present preferred embodiments, it should be evident that it is not limited thereto.

What is claimed is:

1. A refractometer comprising a radiation source, a radiation detector unit comprising first and second radiation detectors mounted adjacent one another, means to direct a beam of radiation from said source toward said detector unit, means disposed in said beam to deflect said beam by an amount representative of the refractive index of a material to be tested, a light opaque barrier, means mounting said barrier between said detector unit and said radiation source so that said first and second detectors are each partially shielded from said beam, a shaft connected to said barrier so that rotation of said shaft in a first direction moves said barrier in a direction to shield more completely one of said detectors and rotation of said shaft in a second direction moves said barrier in a direction to shield more completely the other of said detectors, a motor adapted to rotate in one direction, first clutch means to connect said motor to said shaft to rotate said shaft in said first direction responsive to rotation of said motor in said one direction, second clutch means to connect said motor to said shaft to rotate said shaft in said second direction responsive to rotation of said motor in said one direction, means to compare the outputs of said detectors, and means responsive to said means to compare to energize said clutches selectively to rotate said shaft in a direction to move said barrier until the amounts of radiation impinging upon said first and second detectors are in a predetermined ratio.

2. A refractometer comprising a radiation source, a radiation detector unit comprising first and second radiation detectors mounted adjacent one another, means to direct a beam of radiation from said source toward said detector unit, means disposed in said beam to deflect said beam by an amount representative of the refractive index of a material to be tested, a lever, a light opaque barrier mounted on said lever, means pivotally mounting said lever adjacent said detector unit so that said first and second detectors are partially shielded by said barrier from said beam, the relative amounts shielded varying as said lever is rotated, a shaft, means connecting said shaft to said lever so that rotation of said shaft in a first direction rotates said barrier in a direction to shield more completely one of said detectors and rotation of said shaft in a second direction rotates said barrier in a direction to shield more completely the other of said detectors, a motor adapted to rotate in one direction, first clutch means to connect said motor to said shaft to rotate said shaft in said first direction responsive to rotation of said motor in said one direction, second clutch means to connect said motor to said shaft to rotate said shaft in said second direction responsive to rotation of said motor in said one direction, means to compare the outputs of said detectors, and means responsive to said means to compare to energize said clutches selectively to rotate said shaft in a direction to move said barrier until the amounts of radiation impinging upon said first and second detectors are in a predetermined ratio.

3. The refractometer of claim 2 wherein said lever is pivotally mounted near the first end thereof adjacent said detector unit, and wherein said means connecting said shaft to said lever comprises an elongated member extending generally parallel to said lever, said elongated member being pivotally mounted near the first end thereof which is opposite said first end of said lever, a pivot member extending between said elongated member and said lever to form a pivot point therebetween, means urging said lever into engagement with said pivot member, and means connecting the second end of said elongated member to said shaft so that rotation of said shaft pivots said elongated member.

4. The refractometer of claim 3 further comprising adjustable means to secure said pivot member to one of said elongated member and said lever so that the location of the pivot point between these members can be varied.

5. A refractometer comprising a radiation source, a radiation detector unit comprising first and second radiation detectors mounted adjacent one another, means to direct a beam of radiation from said source toward said detector unit, means disposed in said beam to deflect said beam by an amount representative of the refractive index of a material to be tested, a lever, a radiation deflector mounted on said lever, means pivotally mounting said lever adjacent said detector unit so that rotation of said lever results in the radiation beam being deflected by said deflector, a shaft, means connecting said shaft to said lever so that rotation of said shaft in a first direction rotates said deflector in a direction to direct more radiation on one of said detectors and rotation of said shaft in a second direction rotates said deflector in a direction to direct more radiation on the other of said detectors, a motor adapted to rotate in one direction, first clutch means to connect said motor to said shaft to rotate said shaft in said first direction responsive to rotation of said motor in said one direction, second clutch means to connect said motor to said shaft to rotate said shaft in said second direction responsive to rotation of said motor in said one direction, means to compare the outputs of said detectors, and means responsive to said means to compare to energize said clutches selectively to rotate said shaft in a direction to move said deflector until the amounts of radiation impinging upon said first and second detectors are in a predetermined ratio.

References Cited in the file of this patent

UNITED STATES PATENTS

| | | |
|---|---|---|
| 1,931,852 | Reichel et al. | Oct. 24, 1933 |
| 2,421,854 | Seaman | June 10, 1947 |
| 2,827,824 | Reinecke | Mar. 25, 1958 |
| 2,837,961 | Reinecke | June 10, 1958 |